US005099385A

United States Patent [19]

Faffart

[11] Patent Number: 5,099,385

[45] Date of Patent: Mar. 24, 1992

[54] PROTECTED REVERSING CONTRACTOR USING A MULTIFUNCTIONAL TRANSMISSION SYSTREM FOR CONTROLLING ACKNOWLEDGEMENT SWITCHES

[75] Inventor: André Faffart, Nanterre, France

[73] Assignee: Telemecanique, France

[21] Appl. No.: 473,502

[22] Filed: Feb. 1, 1990

[30] Foreign Application Priority Data

Feb. 3, 1989 [FR] France ............................... 89 01393

[51] Int. Cl.[5] ...................... H02P 3/20; H01H 67/12; H01H 73/36; H02H 3/10

[52] U.S. Cl. .................................. 361/245; 361/102; 361/167; 361/193; 335/131

[58] Field of Search .................. 335/131, 132, 14, 22; 361/102, 114, 115, 187, 206–208, 167, 245, 246, 192, 193; 200/50 A, 50 C, 61.62; 307/328, 112, 139, 140, 143; 318/280, 289, 293, 763, 764, 373

[56] References Cited

U.S. PATENT DOCUMENTS 4,803,587 2/1989 Fournier et al. ...................... 361/24
4,947,145 8/1990 Ohishi et al. .......................... 335/14

*Primary Examiner*—A. D. Pellinen
*Assistant Examiner*—David Osborn
*Attorney, Agent, or Firm*—William A. Drucker

[57] ABSTRACT

A protected reversing contactor is disclosed comprising two electromagnets intended to be alternately energized and whose armatures actuate two sets of respective phase switches and two acknowledgement switches mounted respectively in series in the supply circuit of the two coils of the two electromagnets. These two acknowledgement switches are actuated by a transmission system comprising two coaxial rotary shafts disposed end to end and each having an arm adapted to be driven in rotation, in one direction, by one of the electromagnets and a finger cooperating with the acknowledgement switch of the other electromagnet.

6 Claims, 4 Drawing Sheets

PROTECTED REVERSING CONTRACTOR USING A MULTIFUNCTIONAL TRANSMISSION SYSTREM FOR CONTROLLING ACKNOWLEDGEMENT SWITCHES

BACKGROUND OF THE INVENTION

The present invention relates to a protected reversing contactor using a multifunctional transmission system for controlling acknowledgement switches.

Generally, reversing contactors of this type comprise, inside a general case, two identical contact maker systems comprising two electromagnets, whose armatures actuate two sets of respective phase switches, whose inputs and outputs are respectively interconnected by two interconnection circuits.

The general principle of such a reversing contactor is well known and will not be described in detail, it being understood that in service only one of the two electromagnets is energized, reversal being obtained by interrupting the power supply to the electromagnet which was energized and by supplying with power the other which was previously inoperative.

Protection of these reversing contactors against prolonged excess currents and overloads is provided by a general protection circuit including a magnetic protection device using, for each phase switch, a magnetic release through the coil of which flows the current passing through this switch, and a thermal protection device comprising bimetallic strips mounted in the phase circuits situated downstream of the output interconnection circuit. Generally, these two protection devices act so as to cause abrupt opening of the set of phase switches via a potential energy release mechanism, following one of the two above current anomalies.

Moreover, these reversing contactors are equipped with a mechanical interlocking system preventing simultaneous closure of the phase switches which, because of the interconnection circuits, would lead to a general short circuit of the mains.

This protection is further completed, in some cases, by the use of acknowledgement switches mounted in series in the circuit supplying the coils of the two electromagnets and which are actuated to cause cut-off of the supply circuit for the electromagnet which is not energized, and thus preventing any possibility of simultaneous energization of the two electromagnets, for example following an erroneous command.

The invention relates more particularly to a reversing contactor of this type in which actuation of the acknowledgement switches is made via a multifunctional transmission system which, in addition to the acknowledgement function, may fulfil other safety functions whose effect is to cause opening of one or both acknowledgement switches.

SUMMARY OF THE INVENTION

According to the invention, this transmission system comprises two coaxial rotary shafts, disposed end to end and each comprising:

- a radial arm adapted so as to be driven in rotation, in one direction, by the armature of a corresponding electromagnet;
- a first finger or similar which projects radially so as to cooperate with the acknowledgement switch of the other electromagnet, for opening this acknowledgement switch at the end of rotational travel in said direction; and
- at least a second finger or similar which projects radially so as to be driven in said direction by an actuating member of a protection device.

In a particularly advantageous embodiment of the invention, the two electromagnets are disposed side by side and have two respective armatures movable in translation parallel to a given direction.

In this case, the two rotary shafts are directed perpendicularly to said direction and are disposed facing these two armatures. The acknowledgement switch associated with each of these electromagnets is situated in a region adjacent this electromagnet and adjacent the corresponding rotary shaft, so as to be actuated by a finger of this shaft.

For this, one of the rotary shafts comprises an axial extension overlapping the second rotary shaft as far as a zone situated beyond the arm carried by this second shaft. The arm associated with the first rotary shaft is then carried by the free end of said extension. With this arrangement, the arm fast with rotary shaft situated on the same side as one of the electromagnets can cooperate with the armature of the other electromagnet.

Advantageously, each acknowledgement switch may comprise a fixed contact element carried by the carcase of the coil of the electromagnet which is associated therewith and a mobile contact element formed by a flexible blade, one end of which cooperates with the fixed contact element and the second end of which is mounted fixedly on a lid of the case, so that removal of said lid involves opening the power supply circuit to said coil. The first end of this flexible blade is extended slightly beyond the fixed contact element, so as to be able to cooperate with one of said first fingers.

In addition, said second fingers may be disposed in the vicinity of each other so as to be urged by a common actuating member provided for simultaneously opening the two acknowledgement switches.

BRIEF DESCRIPTION OF THE DRAWINGS

Embodiments of the invention will be described hereafter, by way of non limitative examples, with reference to the accompanying drawings in which.

DESCRIPTION OF THE PREFERRED EMBODIMENTS

Figure 1:
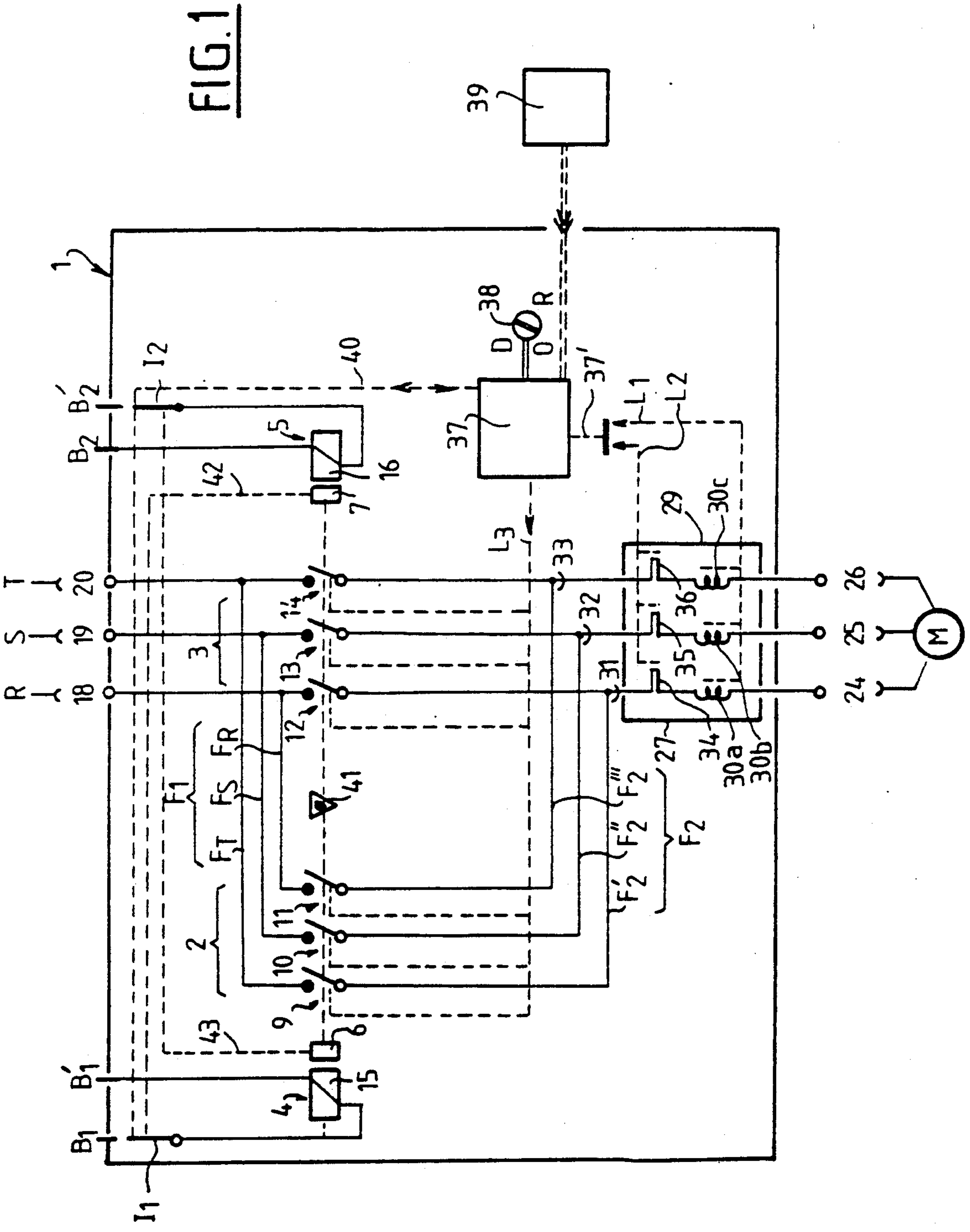
FIG. 1 is a general diagram of a protected reversing contactor of the type of which it is a question in the application.

In the general diagram shown in FIG. 1, the protected reversing contactor comprises, inside a general case 1, two identical three-phase contact maker systems 2,3 each comprising an electromagnet 4,5 whose armature 6,7 actuates a set of phase switches 9,10,11 and 12,13,14 and whose coils 15,16 may be energized by a remote control circuit connected to terminals $B_1$, $B'_1$–$B_2$–$B'_2$.

Upstream of the mains RST, these switches 9 to 14 are connected respectively to three general input terminals 18,19,20 and are connected together by a first harness $F_1$ of interconnecting conductors $F_R$, $F_S$, $F_T$.

The outputs of these switches 9 to 14 are connected respectively to the three input terminals 31,32,33 of a general protection circuit (block 27) via a second harness $F_2$ of interconnecting conductors $F'_2$, $F''_2$, $F'''_2$, the three outputs of this circuit 27 being interconnected to a motor M.

This general protection circuit comprises, in series between each input 31,32,33 and output 24,25,26 pair, a thermal release formed here by a bimetallic strip 34,35,36 reacting to current overloads which are prolonged in time, and a magnetic release 30*a*, 30*b*, 30*c* responsive to short circuit currents.

These thermal 34,35,36 and magnetic 30*a*,30*b*,30*c* releases act (connections $L_1$, $L_2$) on the release member 37' of a spring release mechanism 37, set by means of a manual control member 38 which acts unidirectionally on switches 9 to 14 via a transmission member (shown by the broken line connection $L_3$). This release mechanism 37 is more particularly adapted so as to cause sudden and simultaneous opening of switches 9 to 14, following the detection of one of the above current anomalies.

Release of this mechanism 37 further causes the simultaneous opening of two acknowledgement switches $I_1$, $I_2$ placed respectively in series with the coils 15,16 of the electromagnets 4,5 (broken line connection 40).

This mechanism is then reset either by the manual reset member 38 or by an auxiliary remote controlled reset box 39.

Finally, it will be noted that the control member 38 may be placed manually (or through the remote control box) in an uncocked condition 0 which causes the simultaneous opening of switches $I_1$, $I_2$ or in a cocked condition A (Auto) which causes closure thereof when the thermal balance conditions are re-established.

Of course, like conventional reversing contactors, a mechanical locking device 41 acting on the armatures 6,7 of the electromagnets 4,5 may be provided so to guarantee that one of the two contact maker systems is open when the other is closed.

Such locking is further backed by electromechanical locking including two mechanical connections 42,43 each connecting the armature 6,7 of one of the electromagnets 4,5 to the acknowledgement switch $I_1$, $I_2$ associated with the coil 15,16 of the other electromagnet 4,5, these two connections 42, 43 being adapted so that closure of one of the electromagnets 4,5 causes opening of the supply circuit of the coil 15,16 of the other electromagnet 4,5.

In the example shown in FIGS. 2 to 5, the reversing contactor is made from three modules, namely: a switch module $M_1$, a direct switching control module $M_2$ and an indirect switching control module $M_3$.

Figure 2:
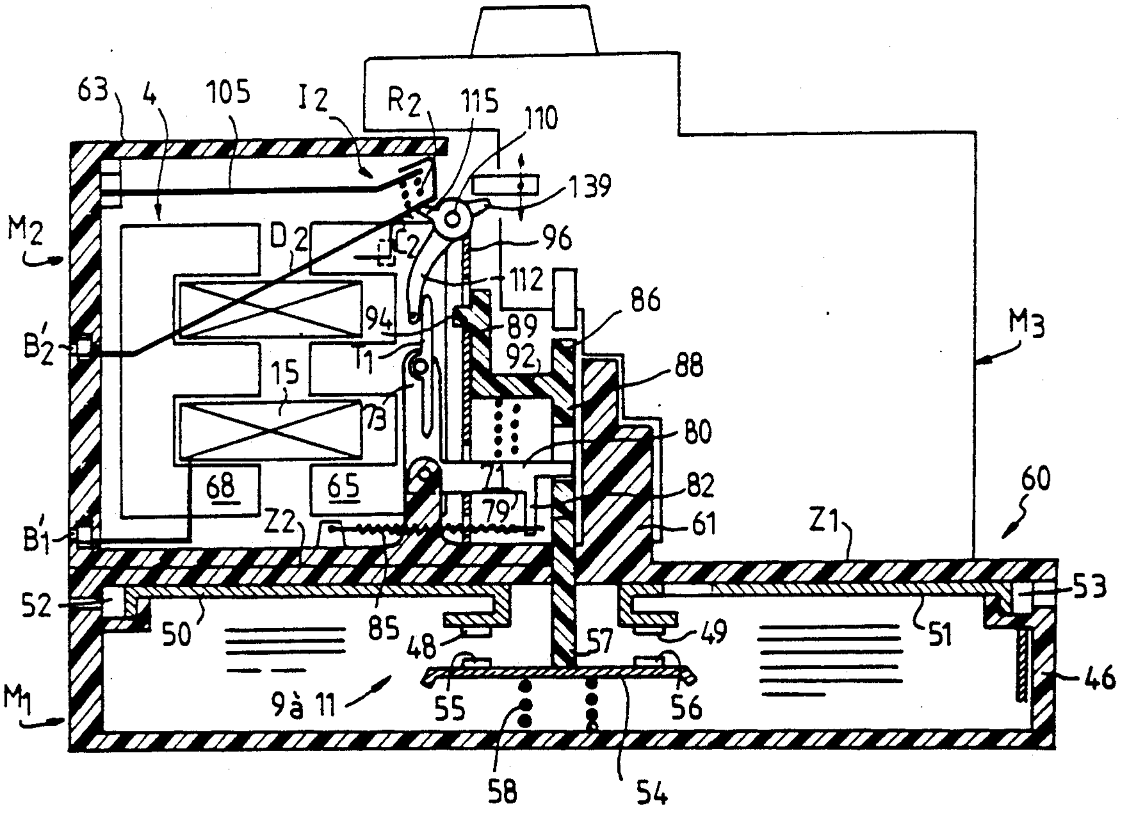
FIGS. 2 and 3 are two schematic longitudinal sectional views of a reversing contactor, these two sections illustrating the principle of the mechanism associated with the two electromagnets of the reversing contactor.
Figure 3:
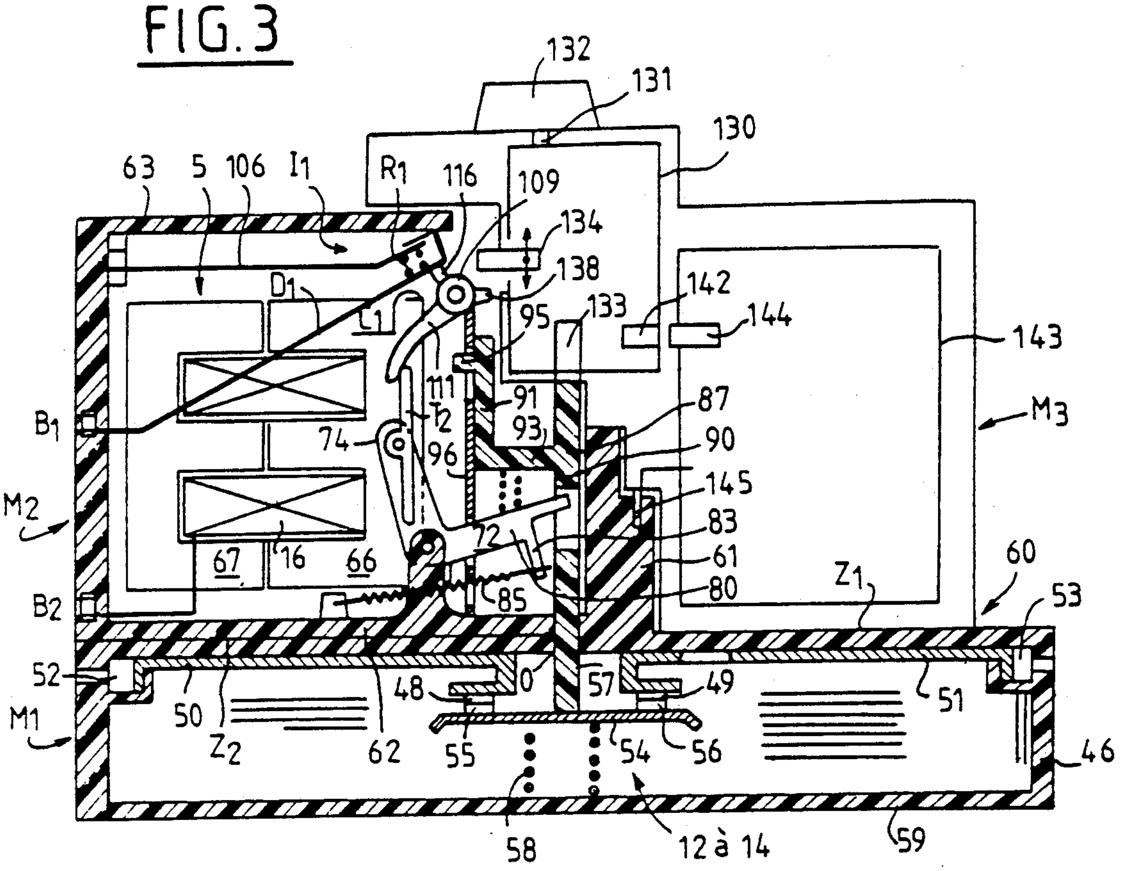

The switch module $M_1$ comprises, inside a case 46, two switching assemblies each with three polar switches 9 to 11 or 11 to 14 disposed side by side and only two of which 9,12, which correspond respectively to these two assemblies, have been shown in FIGS. 2 and 3.

These switches 9 to 14, of normally closed type, each comprise:

- two fixed contact elements 48,49 carried by two conductors 50,51 respectively connected to two connectors 52,53;
- a mobile assembly comprising a mobile contact holder 54 made from an electrically conducting material and on which two mobile contact elements 55,56 are mounted for cooperating with the respective fixed contact elements 48,49;
- a control member consisting of a pusher 57 made from an electrically insulating material and integral with the mobile contact holder 54;
- a spring 58 disposed between the support wall 59 of case 46 and the mobile contact holder 54, so as to exert a force tending to apply the mobile contacts 55,56 against the fixed contacts 48,49.

More precisely, case 46 has an elongate shape of a general substantially parallelepipedic trend and comprises, opposite the support face 59, an assembly face 60 having a transverse dividing wall 61 in its middle portion. This transverse dividing wall 61 divides the assembly face 60 into two zones $Z_1$, $Z_2$ respectively receiving the direct switching control module $M_2$ and the indirect switching control module $M_3$. It comprises, on assembly zone $Z_1$ side, a stepped profile and, on zone $Z_2$ side, a flat face F perpendicular to the assembly face 60.

Zone $Z_2$ comprises, in the vicinity of the dividing wall 61, six orifices 0 aligned perpendicularly to the plane of FIGS. 2 and 3 through which the pushers 57 of the six switches 9 to 14 pass.

The direct switching control device $M_2$ is housed in a parallelepipedic shaped case having an open side situated facing dividing wall 61, a base 62 fixed on the assembly zone $Z_2$ and a lid 63 which extends over the four other sides of the case.

This case contains two electromagnets 4,5 disposed side by side, whose armatures 65,66, in the form of an E, which cooperate with fixed yokes, also in the form of an E 67,68, are movable in translation parallel to base 62 and perpendicularly to dividing wall 61. Advantageously, the fixed yokes 67,68 are removably mounted on the single lid 63. Thus, with lid 63 removed, the two coils are directly accessible and may be readily changed for example so as to accommodate a voltage change.

Figure 4:
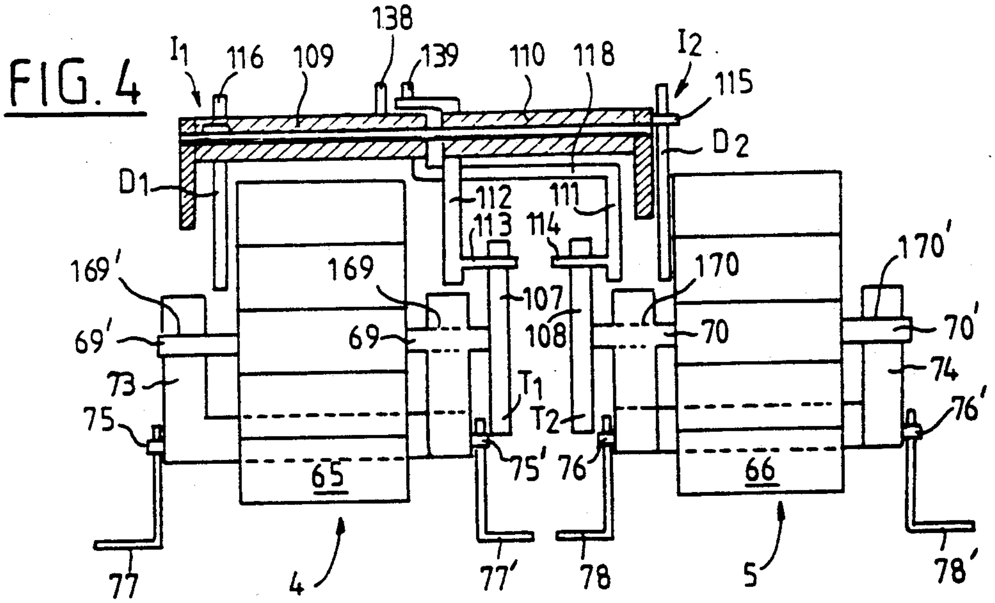
FIG. 4 is a partial cross sectional view of the reversing contactor shown in FIGS. 2 and 3, this section passing through the common axis of the shaft actuating the acknowledgement switches.
Figure 5:
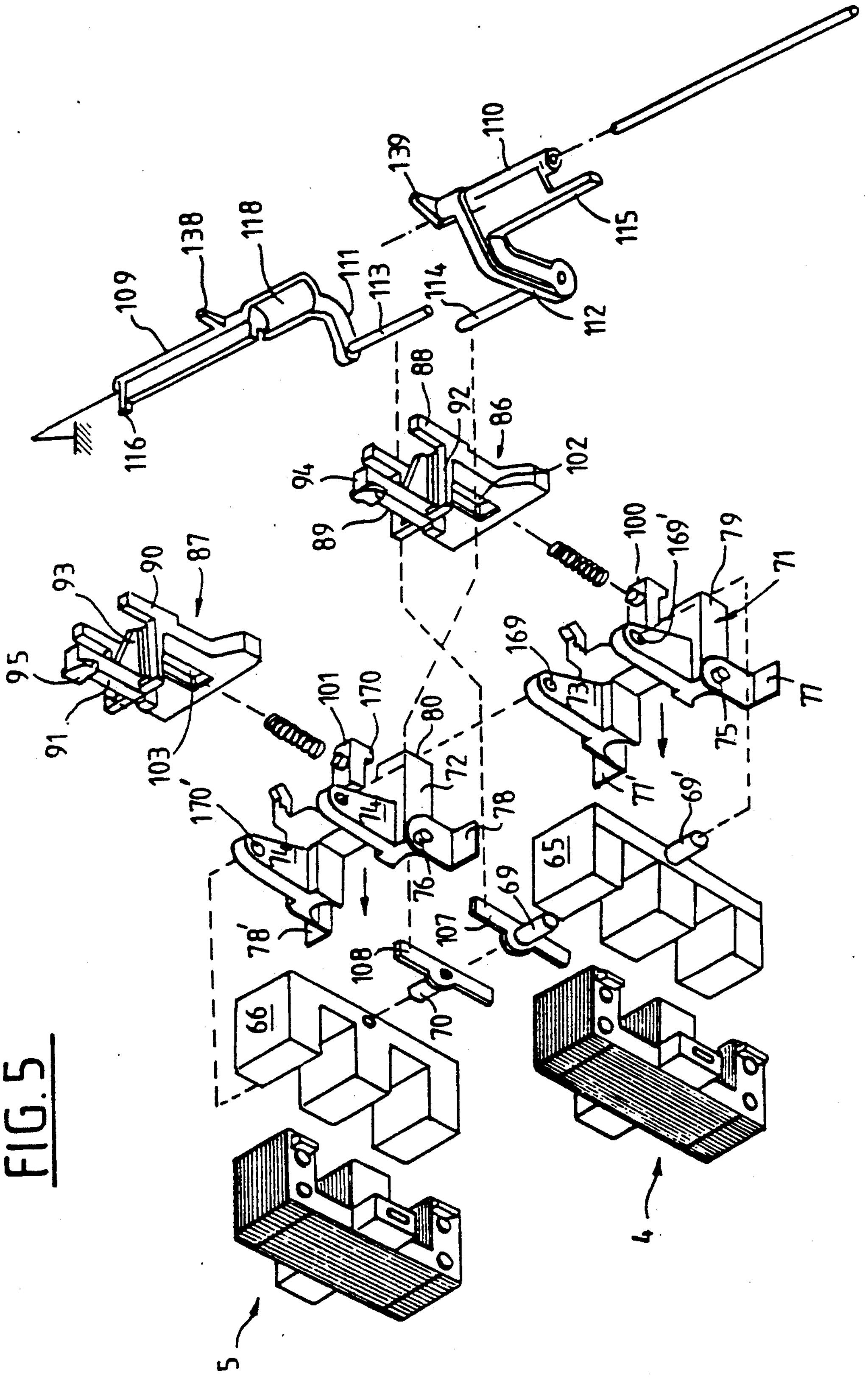
FIG. 5 is a schematic perspective view of the mechanisms associated with the two electromagnets.

As can be seen in FIGS. 4 and 5, each of these armatures 65,66 carries two lateral journals 69,69'–70,70' which are engaged in two respective coaxial bores 169,169'–170,170' of a bearing fork 71,72 mounted for pivoting on the base via an articulation system directed parallel to journals 69,69'–70,70'.

Forks 71, 72 are formed by two parallel L structures joined together, whose vertical bars 73,74 have, at their ends, the two bores 169,169'–170,170' and whose angular regions have two respective journals 75,75'–76,76' which are engaged in bores formed in articulation elements 77,77'–78,78' integral with base 62.

The free end of the horizontal bar of the L 79,80, which is oriented towards dividing wall 61, forms a flange 82,83 on which is engaged one of the ends of a traction spring 84, 85 whose other end is retained by a protuberance integral with base 62.

These springs 84, 85 are pre-tensioned so as to exert on the corresponding forks 71, 72 a force tending to cause them to swing in a clockwise direction as far as an end of travel abutment position in which the horizontal bars 79, 80 are substantially parallel to base 62 and the armatures 65, 66 of electromagnets 4, 5 occupy a rest position, spaced away from the fixed yokes 67, 68.

Furthermore, these horizontal bars 78, 79 further play the role of a transmission lever for actuating two respective slides 86, 87 mounted for sliding parallel to dividing wall 61.

These slides 86, 87 each have two parallel projections 88, 89-90, 91 connected together by two respective transverse portions 92, 93, projections 88, 90 each bearing on the three pushers 57 of a set of corresponding switches 9 to 11 or 11 to 14. Projections 89, 91 are each provided with a guide slider 94, 95 which engages in a slit formed in a metal dividing wall 96 fast with base 62 and which extends parallel to the dividing wall 61.

Actuation of these slides 86, 87 by the corresponding forks 71, 72 is provided unidirectionally through the engagement of stops 100, 101 provided at the free end of the horizontal bars 79, 80 of the forks in respective oblong cavities formed in projections 88, 90 of slides 86, 87.

It is clear that in the de-energized condition of an electromagnet 4, 5, the corresponding fork 71, 72 urged by the traction spring 84, 85 holds the armature 65, 66 of this electromagnet in a rest position, while exerting on the pushers 67, through the stop 100, 101 and the slide 86, 87, a pressure for holding the switches concerned 9 to 11 or 11 to 14 in the open position against the action of springs 58.

On the other hand, when this electromagnet is energized, it causes fork 71, 72 to swing in an anti-clockwise direction against the action of the traction spring 84, 85. Concurrently, the mobile assembly formed by the mobile contact bridge 54, pusher 57 and slide 86, 87 which is no longer retained by stop 100, 101 rises until the mobile contacts 55, 56 are applied against the fixed contacts 48, 49. The switches concerned 9 to 11 or 11 to 14 are then in the closed position.

As mentioned above, this energization may be provided by a remote control circuit connected to the supply terminals of the coils of the two electromagnets provided on the lid (at the rate of 2 terminals $B_1$, $B'_1$-$B_2$, $B'_2$ per electromagnet coil 15, 16).

Inside the case, the electrical connection between coil 15, 16 of each of the electromagnets 4, 5 and the two terminals $B_1$, $B'_1$-$B_2$, $B'_2$ which correspond thereto, comprises an acknowledgement switch $I_1$, $I_2$ of normally closed type, having a fixed contact $C_1$, $C_2$ mounted on the insulating carcase of coil 15, 16 and a mobile contact formed by one of the ends of a flexible blade $D_1$, $D_2$ whose other end is fast with lid 63. The contact pressure between the end of blade $D_1$, $D_2$ and the fixed contact $C_1$. $C_2$ is provided by a pressure spring $R_1$, $R_2$ retained by a rigid tongue 105, 106 fast with lid 63. This arrangement has the advantage of automatically causing cut-off of the supply to coils 15, 16 of the electromagnets 4, 5 when the lid 63 is removed.

The two acknowledgement switches $I_1$, $I_2$ associated with the two coils are disposed laterally with respect to the electromagnets 4, 5, the assembly formed by the fixed contacts $C_1$, $C_2$ and the ends of the flexible blades $D_1$, $D_2$ being situated in the vicinity of the upper edge of lid 63 adjacent the open face of the case.

It should be noted that, in FIG. 2, the acknowledgement switch $I_2$ shown is mounted in the supply circuit for the coil 16 of the electromagnet shown in FIG. 3, whereas switch $I_1$ of FIG. 3 is mounted in the supply circuit to the coil 15 of the electromagnet shown in FIG. 2.

Actuation of these switches $I_1$, $I_2$ from the armatures of the electromagnets is provided by two mechanical connections, comprising, for each of the electromagnets 4, 5:

a transmission piece $T_1$, $T_2$ mounted fixedly on one of the journals 69, 70 on the armature of this electromagnet, this piece $T_1$, $T_2$ having at least one arm 107, 108 projecting radially from the journal, which moves with the armature in a plane perpendicular to the axis of journals 69, 70, and a shaft 109, 110 rotating about an axis parallel to the axis of journals 69, 70, this shaft having a radial arm 111, 112, the free end of which is provided with a pin 113, 114 engaged with arm 107, 108 as well as two fingers 115, 139-116, 138 whose roles will be defined hereafter.

Advantageously, the two transmission pieces $T_1$ and $T_2$ equip the two facing journals 69, 70 which extend in the gap between the two armatures 65, 66 of the electromagnets 4, 5.

The two rotary shafts 109, 110 are disposed coaxially end to end about a common axis 113 fixed to dividing wall 96.

The shaft 110, which extends on the armature 66 side, has at its end adjacent shaft 109 a radial arm 112 which is situated so as to engage with arm 107 carried by the journal 69 fast with armature 65.

Shaft 109, which extends facing armature 65, is extended beyond its end by a gutter shaped portion 118 which overlaps shaft 110 and has, at its end, the radial arm 111 which engages with arm 108 carried by journal 70 fast with armature 66.

Fingers 115, 116 are disposed so as to cooperate with the ends of the flexible blades $D_1$, $D_2$ which form the mobile contacts of the acknowledgement switches $I_1$, $I_2$, in the following way.

When one, 4, of the two electromagnets is in the deenergized condition and when the polar switches 9 to 11 which it actuates are therefore open (position shown in FIG. 2), the arm 107 of the piece $T_1$ associated with this electromagnet is in a position allowing shaft 110 to rotate in an anticlockwise direction. Consequently, the end of the flexible blade $D_2$ which forms the mobile contact of the acknowledgement switch $I_2$ associated with the other electromagnet 5 will, under the effect of the spring, bear on the fixed contact $C_2$ and, by its action on finger 115, cause shaft 110 to rotate which tends to bring arm 112 against arm 107. Because the acknowledgement switch $I_2$ is closed, the electromagnet 5 may be energized and take up the position shown in FIG. 3.

In this position, fork 72 occupies an inclined position, against the action of the traction spring 85 and allows the polar switches 11 to 14 to close again under the action of spring 58. Arm 108 acts on arm 111 so as to hold shaft 109 in an angular position in which finger 116 holds the end of the flexible blade $D_1$ of the acknowledgement switch $I_1$ associated with electromagnet 4 away from the fixed contact $C_1$.

The circuit of the coil 15 of the electromagnet 4 is therefore open and so prevents any possibility of energizing this electromagnet 4.

It is clear that, from the condition of the reversing switch illustrated in FIGS. 2 and 3 that deenergization of electromagnet 5 will cause fork 72 to swing under the effect of the traction spring 85 and the polar switches 12 to 14 controlled by this electromagnet 5 to pass to the open condition. Concurrently, when it moves, arm 108 frees arm 111 and finger 116 pivots with shaft 109 so as to let the end of the flexible blade $D_1$ come back against the fixed contact $C_1$ under the effect of spring $R_1$. Thus, electromagnet 4 may be energized, in which case the reversing switch will be in a condition symmetrical with that illustrated in FIGS. 2 and 3.

In this example, the indirect switching control module $M_3$ comprises both a potential accumulation release mechanism and the protection devices which are associated therewith, namely in particular the magnetic trips and the thermal bimetallic strips. This release device has been shown schematically by a block 130 into which the shaft 131 of a resetting control knob 132 penetrates and which comprises two actuating members, namely:

a first actuating member 133 shown by a pusher for cooperation with the upper face of projections 80, 90 of slides 86, 87 and a second actuating member 134 shown by a pusher disposed so as to cooperate with fingers 138, 139 carried respectively by shafts 109, 110.

The first actuating member 133 may assume two positions, namely:

a retracted position which corresponds to the set condition of the release module and to the "stop" and "Auto" positions of the knob, in which position this member 133 exerts no action on slides 86, 87 so that the polar switches 9 to 14 can pass to their normally closed positions under the action of the electromagnets 4, 5; and following release, an extended position in which it bears on slides 86, 87 so as to hold all the polar switches 9 to 14 open.

The second actuating member 134 (movable in translation as shown by the double arrow) may also take up a rest position (corresponding to the "Auto" position of the knob) in which it does not urge the fingers 138, 139 and a work position (other positions of knob 132) in which it acts on the two fingers 138, 139 so as to hold shafts 109 and 110 in an angular position in which fingers 115 and 116 cause opening of the acknowledgement contacts $I_1$ and $I_2$ of the two electromagnets 4, 5, so as to prevent energization thereof when knob 132 is not in the "Auto" position.

The release device 130 further comprises a release member 142 shown here by a pusher which, when it is urged, causes the first actuating member 133 to pass suddenly from its retracted position to its extended position.

The protection devices, associated with the release device 130 and here housed in the indirect switching control module $M_3$, have been shown schematically by a block 143 in FIG. 3.

They comprise an actuating member 144, shown by a pusher, disposed so as to urge the release member 142 following detection of an anomaly of the current flowing through the polar switches.

The electric connections between the current lines passing through these polar switches 9 to 14 and these protection devices are provided by six pairs of connection elements 145 provided on a step of dividing wall 61.

What is claimed is:

1. A protected reversing contactor of the type comprising two identical contact making systems with two electromagnets intended to be energized alternately and whose armatures actuate two sets of respective phase switches which have inputs interconnected by an input interconnection circuit and outputs interconnected by an output interconnection circuit and two acknowledgement switches mounted respectively in series in a supply circuit of the coils of the two electromagnets, these two acknowledgement switches being actuated by a mechanical transmission system for cutting off the supply circuit to the electromagnet which is not energized, wherein said transmission system comprises two coaxial rotary shafts, disposed end-to end and each comprising:

a radial arm driven in rotation, in one direction, by the armature of a corresponding electromagnet;

a first finger projecting radially so as to cooperate with the acknowledgement switch of the other electromagnet, for opening this acknowledgement switch at the end of the rotational travel of said shaft in said direction.

2. The reversing contactor as claimed in claim 1, wherein said rotary shafts each comprise at least one second finger projecting radially so as to be driven in said direction by an actuating member of a protection device.

3. The reversing contactor as claimed in claim 1, wherein said two electromagnets are disposed side by side and have two respective armatures which are movable in translation parallel to a given direction, the two rotary shafts are directed perpendicularly to said direction and are disposed facing these armatures, the acknowledgement switch associated with each of these electromagnets being situated in a region adjacent this electromagnet and adjacent the corresponding rotary shaft, so as to be actuated by the first finger of this shaft and the arm associated with one of said rotary shafts is carried by an axial extension of this shaft, which overlaps the second rotary shaft, beyond the arm integral with this second shaft, the two arms being then disposed so that the arm integral with the rotary shaft situated on one side of one of the electromagnets cooperates with the armature of the other electromagnet.

4. The reversing contactor as claimed in claim 1, wherein each acknowledgement switch comprises a fixed contact element carried by a case of the coil of the electromagnet which is associated therewith and a mobile contact element formed by a flexible blade, a first end of which cooperates with the fixed contact element and the second end of which is mounted fixedly on a lid of the case housing the electromagnet, so that removal of said lid involves opening the power supply circuit to said coil.

5. The reversing contactor as claimed in claim 4, wherein the first end of said flexible blade extends beyond the fixed contact element so as to cooperate with one of said first fingers:

6. The reversing contactor as claimed in claim 2, comprising a general protection device operative to cause abrupt opening of the set of phase switches via a potential energy release mechanism following a current anomaly detected by at least one sensor, said release mechanism comprising a manual control member for resetting it as well as an actuator acting on said second fingers so as to cause opening of said acknowledgement switches, when said manual control member is not in a predetermined position.

* * * * *